United States Patent
Taylor et al.

(10) Patent No.: US 9,495,460 B2
(45) Date of Patent: Nov. 15, 2016

(54) MERGING SEARCH RESULTS

(75) Inventors: Michael J. Taylor, Cambridge (GB);
Filiip Radlinski, Cambridge (GB);
Milad Shokouhi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 490 days.

(21) Appl. No.: 12/473,158

(22) Filed: May 27, 2009

(65) Prior Publication Data
US 2010/0306213 A1   Dec. 2, 2010

(51) Int. Cl.
*G06F 17/30* (2006.01)

(52) U.S. Cl.
CPC .................... *G06F 17/30867* (2013.01)

(58) Field of Classification Search
CPC ............ G06F 17/30864; G06F 17/30867; G06F 17/30067; G06F 17/30011; G06F 17/30893; G06F 17/30882; G06F 17/30702; G06Q 30/02
See application file for complete search history.

(56) References Cited

U.S. PATENT DOCUMENTS

| | | | |
|---|---|---|---|
| 6,185,534 B1 * | 2/2001 | Breese et al. ................ | 704/270 |
| 6,489,968 B1 * | 12/2002 | Ortega et al. ................ | 715/713 |
| 6,665,653 B1 * | 12/2003 | Heckerman et al. .......... | 706/47 |
| 7,346,613 B2 | 3/2008 | Hurst-Hiller et al. | |
| 7,660,705 B1 * | 2/2010 | Meek et al. ..................... | 703/2 |
| 8,032,535 B2 * | 10/2011 | Strehl et al. .................. | 707/748 |
| 2001/0037332 A1 * | 11/2001 | Miller et al. ................... | 707/4 |
| 2002/0052880 A1 * | 5/2002 | Fruensgaard et al. ........ | 707/104.1 |
| 2002/0165856 A1 | 11/2002 | Gilfillan et al. | |
| 2004/0215607 A1 | 10/2004 | Travis, Jr. | |
| 2005/0015366 A1 * | 1/2005 | Carrasco et al. ............. | 707/3 |
| 2005/0027699 A1 | 2/2005 | Awadallah et al. | |
| 2005/0071465 A1 | 3/2005 | Zeng et al. | |
| 2005/0149496 A1 * | 7/2005 | Mukherjee et al. .......... | 707/3 |

(Continued)

FOREIGN PATENT DOCUMENTS

| | | |
|---|---|---|
| JP | H0756948 A | 3/1995 |
| JP | H11-110406 A | 4/1999 |

(Continued)

OTHER PUBLICATIONS

PCT International Search Report dated Jan. 3, 2011 from corresponding PCT International Application No. PCT/US2010/036487, filed May 27, 2010, 4 pages.

(Continued)

*Primary Examiner* — James Trujillo
*Assistant Examiner* — Jessica N Le
(74) *Attorney, Agent, or Firm* — Tom Wong; Micky Minhas; Zete Law, P.L.L.C.

(57) ABSTRACT

Merging search results is required, for example, where an information retrieval system issues a query to multiple sources and obtains multiple results lists. In an embodiment a search engine at an Enterprise domain sends a query to the Enterprise search engine and also to a public Internet search engine. In embodiments, results lists obtained from different sources are merged using a merging model which is learnt using a machine learning process and updates when click-through data is observed for example. In examples, user information available in the Enterprise domain is used to influence the merging process to improve the relevance of results. In some examples, the user information is used for query modification. In an embodiment a user is able to impersonate a user of a specified group in order to promote particular results.

21 Claims, 12 Drawing Sheets

(56) References Cited

U.S. PATENT DOCUMENTS

| | | | |
|---|---|---|---|
| 2005/0163302 A1* | 7/2005 | Mock et al. | 379/211.02 |
| 2005/0251437 A1* | 11/2005 | Meuleman | 705/10 |
| 2006/0004732 A1 | 1/2006 | Odom | |
| 2006/0064411 A1 | 3/2006 | Gross et al. | |
| 2006/0259476 A1 | 11/2006 | Kadayam et al. | |
| 2006/0288000 A1 | 12/2006 | Gupta | |
| 2007/0016583 A1* | 1/2007 | Lempel et al. | 707/9 |
| 2007/0106688 A1* | 5/2007 | Chang et al. | 707/104.1 |
| 2007/0192300 A1 | 8/2007 | Reuther et al. | |
| 2007/0203887 A1* | 8/2007 | Dynin | 707/3 |
| 2007/0208730 A1* | 9/2007 | Agichtein et al. | 707/5 |
| 2007/0276812 A1 | 11/2007 | Rosen | |
| 2008/0005090 A1* | 1/2008 | Khan et al. | 707/4 |
| 2008/0040316 A1 | 2/2008 | Lawrence | |
| 2008/0072180 A1* | 3/2008 | Chevalier et al. | 715/861 |
| 2008/0077558 A1 | 3/2008 | Lawrence et al. | |
| 2008/0082625 A1* | 4/2008 | Karaoguz et al. | 709/217 |
| 2008/0091650 A1* | 4/2008 | Fontoura et al. | 707/3 |
| 2008/0104140 A1* | 5/2008 | Vierich et al. | 707/202 |
| 2008/0215553 A1* | 9/2008 | Badros et al. | 707/3 |
| 2008/0256036 A1* | 10/2008 | Falk et al. | 707/3 |
| 2009/0043593 A1 | 2/2009 | Herbrich et al. | |
| 2009/0144244 A1* | 6/2009 | Maghoul et al. | 707/3 |
| 2009/0172730 A1* | 7/2009 | Schiff et al. | 725/34 |
| 2009/0287645 A1* | 11/2009 | Dasdan et al. | 707/3 |
| 2010/0070486 A1* | 3/2010 | Punaganti Venkata et al. | 707/722 |
| 2010/0174704 A1* | 7/2010 | Ciravegna et al. | 707/722 |
| 2010/0228804 A1* | 9/2010 | Dasgupta et al. | 707/915 |
| 2010/0299367 A1* | 11/2010 | Chakrabarti et al. | 707/803 |
| 2011/0040741 A1* | 2/2011 | Korte et al. | 707/706 |
| 2011/0145234 A1* | 6/2011 | Hu | 707/728 |
| 2012/0005200 A1* | 1/2012 | Lawrence | 707/723 |
| 2012/0226675 A1* | 9/2012 | Dexter et al. | 707/706 |

FOREIGN PATENT DOCUMENTS

| | | |
|---|---|---|
| JP | H11-184862 A | 7/1999 |
| JP | 2001142908 A | 5/2001 |
| JP | 2002032401 A | 1/2002 |
| JP | 2004094813 A | 3/2004 |
| JP | 2004530195 A | 9/2004 |
| JP | 2005032193 A | 2/2005 |
| JP | 2006155043 A | 6/2006 |
| JP | 2006524871 A | 11/2006 |
| JP | 2008217600 A | 9/2008 |
| JP | 2009015552 A | 1/2009 |
| KR | 10-2006-0017502 | 2/2006 |
| RU | 2343537 C2 | 1/2009 |
| WO | 02073864 A2 | 9/2002 |
| WO | 03019420 A1 | 3/2003 |

OTHER PUBLICATIONS

Drake, "New Ovid Universal Search Reaches Out to Web Databases", retrieved from the internet at http://newsbreaks.infotoday.com/nbReader.asp?ArticleId=51182.

"Exalead Desktop Portal Edition", retrived from the Internet at http://www.exalead.com/software/common/pdfs/products/desktop-search/Exalead-Desktop-Search-White-Label-Edition.pdf.

Hawking, "Challenges in Enterprise Search", Australian Computer Societ, 2004, appeared in 15th Australian Database Conference (ADC2004) Dunedin, NZ, retrieved from the Internet at http://citeseerx.ist.psu.edu/viewdoc/download?doi=10.1.1.4.5854&rep=rep1&type=pdf.

Radlinski, et al., "How Does Clickthrough Data Reflect Retrieval Quality?" Proceedings of the 17th ACM Conference on Information and Knowledge Management, Oct. 26-30, 2008, Napa Valley, CA.

Teevan, et al., "Discovering and Using Groups to Improve Personalized Search", WSDM'09, Feb. 9-12, 2009, Barcelona, Spain, retrieved from the internet at http://research.microsoft.com/pubs/76827/wsdm09-groupization.pdf.

"Universal Search", retrieved from the internet at http://www.prepfire.com/16.html.

<<http://www.google.com/enterprise/universal_search.html>>, archived on Jan. 21, 2009, retrieved from <<http://web.archive.org/web/20090121152414/http://google.com/enterprise/universal_search.html>> on Dec. 20, 2011, 2 pages.

<< http://code.google.com/p/relatedwebresults/ >>, archived on Oct. 25, 2008, retrieved from <<http://web.archive.org/web/20081025105235/http://code.google.com/p/relatedwebresults/>> on Dec. 20, 2011, 1 page.

Thomas, Server characterisation and selection for personal metasearch, a thesis submitted for the degree of Doctor of Philosophy of the Australian National University, May 2008, 221 pages.

Extended European Search Report dated Dec. 10, 2012 for European Application No. 10781247.1, 7 pages.

Keyhanipour et al. "Aggregation of web search engines based on users' preferences in WebFusion", Knowledge-Based Systems, Elsevier, vol. 20, No. 4, Apr. 13, 2007, pp. 321-328.

"Fifth Office Action Issued in Chinese Patent Application No. 201080023853.7", Mailed Date: Aug. 7, 2014, 14 Pages.

"Fourth Office Action Issued in Chinese Patent Application No. 201080023853.7", Mailed Date: Apr. 23, 2014, 12 Pages.

"Second Office Action Issued in Chinese Patent Application No. 201080023853.7", Mailed Date: Sep. 10, 2013, 15 Pages.

"Third Office Action Issued in Chinese Patent Application No. 201080023853.7", Mailed Date: Jan. 22, 2014, 12 Pages.

"Office Action Issued in Russian Patent Application No. 2011148231", Mailed Date: Jun. 25, 2014, 5 Pages.

"Office Action Issued in Japanese Patent Application No. 2012513274", Mailed Date: Jan. 28, 2014, 4 Pages.

"Office Action Issued in Chinese Patent Application No. 201080023853.7", Mailed Date: Jan. 15, 2015, 13 Pages.

"Notice of Allowance Issued in Russian Patent Application No. 2011148231", Mailed Date: Nov. 24, 2014, 11 Pages. (Without English Translation).

"Office Action Issued in Japanese Patent Application No. 2012-513274", Mailed Date: Jan. 6, 2015, 4 Pages.

"Office Action Issued in Chile Patent Application No. 201102944", Mailed Date: Oct. 13, 2014, 6 Pages. (Without English Translation).

"Office Action Issued in Chile Patent Application No. 2944-2011", Mailed Date: Apr. 7, 2015, 6 Pages. (Without English Translation).

"Office Action Issued in Israel Patent Application No. 215753", Mailed Date: May 3, 2015, 3 Pages. (Without English Translation).

"Notice of Allowance Issued in Russian Patent Application No. 2011148231", Mailed Date: Nov. 20, 2014, 11 Pages. (Without English Translation).

"Office Action Issued in Chilean Patent Application No. 201102944", Mailed Date: Oct. 13, 2014, 6 Pages. (Without English Translation).

"Office Action Issued in Chilean Patent Application No. 201102944", Mailed Date: Apr. 7, 2015, 6 Pages. (Without English Translation).

"Office Action Issued in Israel Patent Application No. 215753", Mailed Date: Aug. 16, 2015, 8 Pages.

* cited by examiner

MERGING SEARCH RESULTS

BACKGROUND

Where federated search is carried out there is typically a need to merge search results received from different search engines that may retrieve information from different sources. For example, federated search can be carried out at a search portal which receives a search query and sends that to a plurality of different search engines. It collects the results and typically provides a user interface whereby the collected results may be accessed. The process of sending the query to the different search engines and receiving the results occurs automatically without the need for user input and may be carried out "behind the scenes" so that the user may be unaware that it is occurring.

In this way, federated search portals are currently used to search many different public sources of information, such as by using Internet search engines, public databases and other public data collections. However, many enterprises, educational organizations, and other entities have access to information sources which are not public. Issues then arise as to how to appropriately provide federated search where at least some of the information sources are public and at least some are not.

Existing federated search systems often simply collect lists of results obtained from different information sources without providing any additional "intelligence" in the way the results are presented. For example, in some federated search systems the portal provides a user interface means whereby the end user is required to manually merge, de-duplicate and sort the results lists from the different information sources. This is time consuming and complex and places undue burden on the end user. This is especially so where the end user is a novice or child with no knowledge even of the existence of the individual data sources being searched.

Other information retrieval systems are known whereby a user is able to operate a user interface in order to specify that a query is issued to a plurality of different sources that the user specifies. The raw results are received at the user interface and presented, often side by side, for the user to manage using tools provided as part of the user interface. This type of search is not automated in the same way as federated search, with the functionality being mainly provided at the user interface rather than at a separate federated search engine. Also, this type of search system is only suitable for expert users with detailed knowledge of the different information sources available.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Merging search results is required, for example, where an information retrieval system issues a query to multiple sources and obtains multiple results lists. In an embodiment a search engine at an Enterprise domain sends a query to the Enterprise search engine and also to a public Internet search engine. In embodiments, results lists obtained from different sources are merged using a merging model which is learnt using a machine learning process and updates when click-through data is observed for example. In examples, user information available in the Enterprise domain is used to influence the merging process to improve the relevance of results. In some examples, the user information is used for query modification. In an embodiment a user is able to impersonate a user of a specified group in order to promote particular results.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "simultaneous scope search" is used herein to refer to using a single search engine to automatically search a plurality of information sources at least one of which is in a private domain to which the single search engine has access and at least one other of which is in a public domain.

Although the present examples are described and illustrated herein as being implemented in an information retrieval system for simultaneous scope search, the system described is provided as an example and not a limitation. As those skilled in the art will appreciate, at least some of the present examples are suitable for application in a variety of different types of information retrieval systems including those for searching a plurality of different sources of information.

Figure 1:
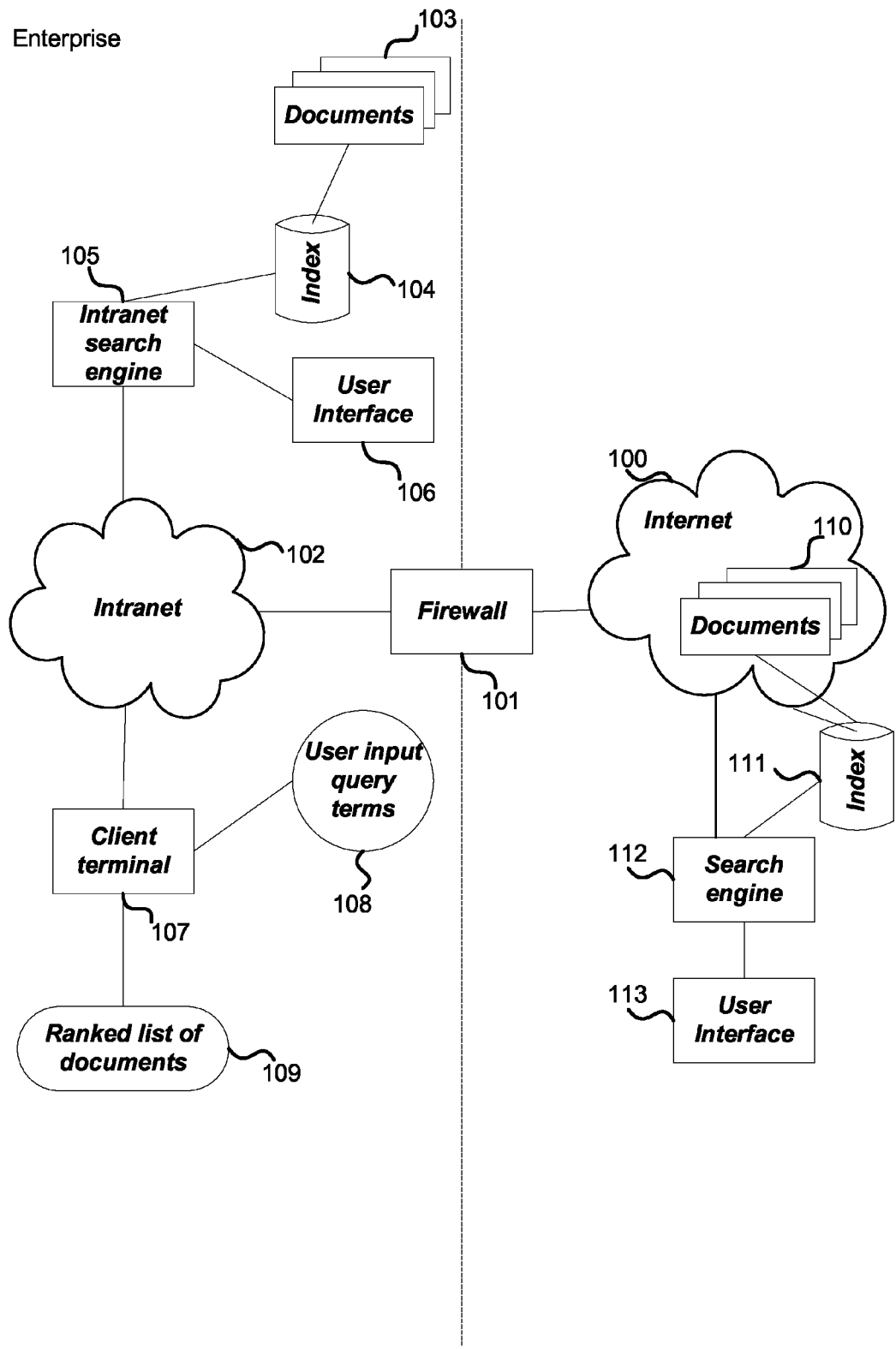
FIG. 1 is a schematic diagram of an information retrieval system at an Enterprise connected behind a firewall to the Internet.

FIG. 1 is a schematic diagram of an information retrieval system at an Enterprise (or other private domain) connected behind a firewall 101 to the Internet 100. The entities to the left of the dotted line in FIG. 1 are referred to herein as being part of the Enterprise domain whereas those to the right of the dotted line are in the public domain. A search engine 112 is provided in the public domain connected to the Internet 100 and arranged to provide a user interface 113 which can be browsed by an end user at a client terminal such as client terminal 107 in the Enterprise domain. The search engine 112 has access to an index 111 of documents 110. It is arranged to receive query terms 108 from an end user at a client terminal 107 (either in the public or private domain) and to return a ranked list of documents 109 using the index 111 as known in the art.

An intranet search engine 105 is also provided in the Enterprise domain and connected to an intranet 102 to which the client terminal 107 is also connected. The intranet search engine 105 has access to an index 104 of documents 103 which are available to users in the Enterprise but which are not generally available outside the Enterprise domain. For example, an intranet for educational organizations may have free access to premium content that is not available on the public internet. Also, an intranet for a national healthcare provider may have access to confidential and/or otherwise expensive information which is not available publicly. In another example, a group of users may have access to a private social networking site with information that is not available publicly. In this case the documents 103 and index 104 in FIG. 1 represent at least some information which is not generally available publicly. The intranet search engine 105 also provides a user interface 106 which is accessible by the client terminal 107. An end user at the client terminal 107 is able to input user query terms 108 to the Intranet search engine user interface 106 to obtain a ranked list of documents 109 from the index 104. In this way the end user is able to manually send queries to either the internet search engine 112 or the intranet search engine 105. However, the end user often does not know from which source they are likely to find the best results. A time consuming process of trial and error often results whereby the end user sends a query to the internet search engine (for example) and reviews the results before sending the same query to the intranet search engine.

Another difference between the intranet search engine 105 and the public internet search engine 112 in FIG. 1 is that the intranet search engine 105 may have access to private user information about users of the intranet which is not available to the public internet search engine 112. For example, this information may be demographic information and/or may comprise confidential details such as the age of the user, the role of the user in the Enterprise (e.g. nurse, doctor, pupil, teacher, manager, support staff), the office location of the user and other such details.

Figure 2:
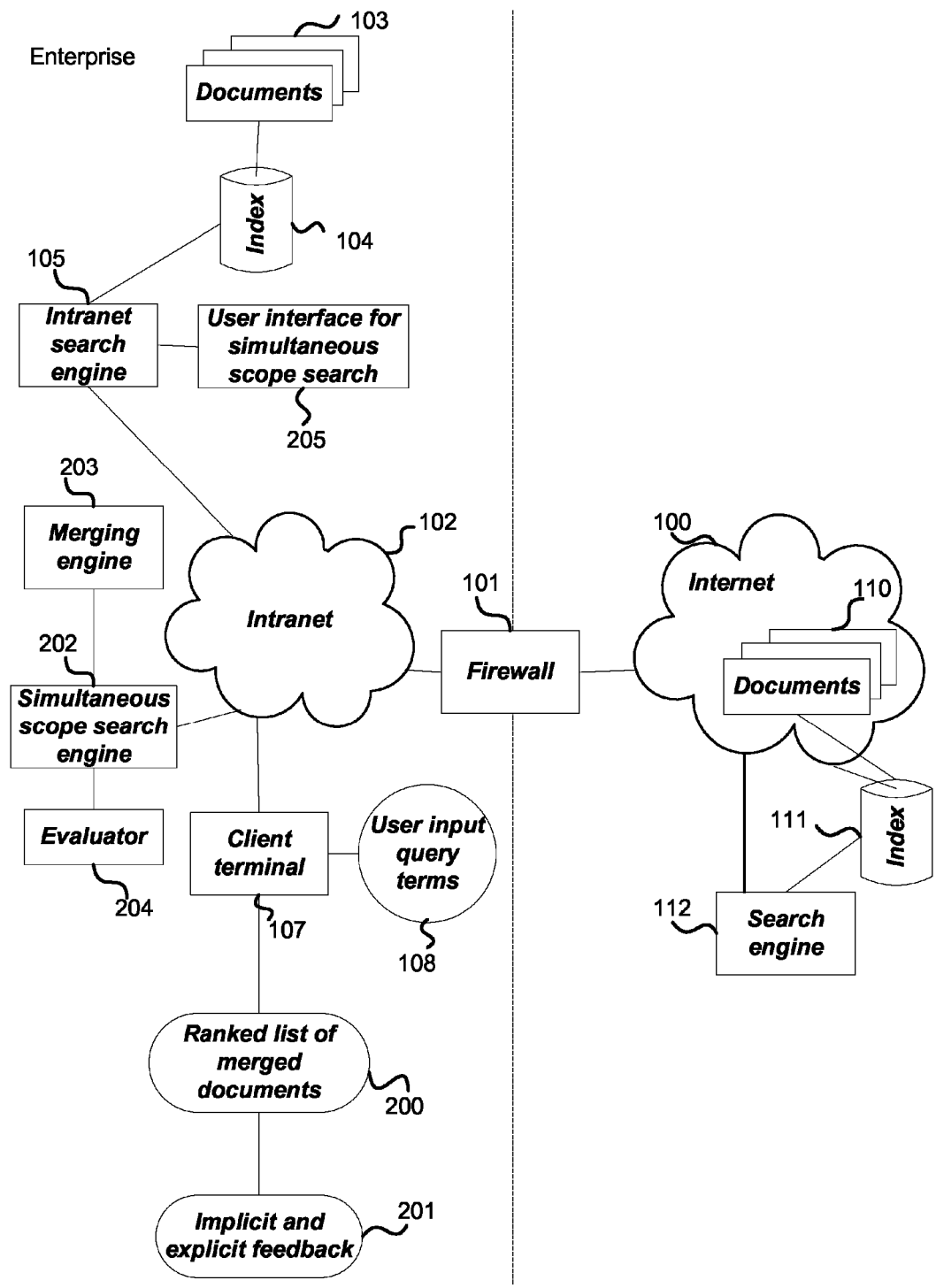
FIG. 2 is a schematic diagram of an information retrieval system having a simultaneous scope search engine at an Enterprise which is connected to the Internet via a firewall.

A simultaneous scope search system may be provided as illustrated in FIG. 2. A simultaneous scope search engine 202 is connected to the intranet and either integral with or in communication with the intranet search engine. Integral with, or connected to the simultaneous scope search engine 202 is a merging engine 203 and an evaluator 204. The intranet search engine has a user interface for simultaneous scope search 205.

A user at a client terminal 107 is able to input user query terms 108 to the user interface for simultaneous scope search 205 and to obtain a ranked list of merged documents 200. The simultaneous scope search engine is arranged to send the query terms 108 to both the intranet search engine 105 and the internet search engine 112 and to receive the results. It is arranged to merge the results using the merging engine 203 and display the ranked, merged results list to the end user at the user interface 205. Implicit and/or explicit feedback 201 is observed at the user interface 205 and fed back to the simultaneous scope search engine. This feedback is used to update the merging engine. That is, a machine learning system at the merging engine enables it to learn how best to merge results. An evaluator 204 is provided to check the performance of the merging engine 203 at intervals in order to ensure that the learning process has been working appropriately. Any suitable evaluator may be used. For example, an interleaved evaluation process may be used as described in Radlinski et al. "How does clickthrough data reflect retrieval quality" Proceedings of $17^{th}$ ACM conference on Information and Knowledge management, pp 43-52, 2008 which is incorporated herein by reference in its entirety.

Figure 3:
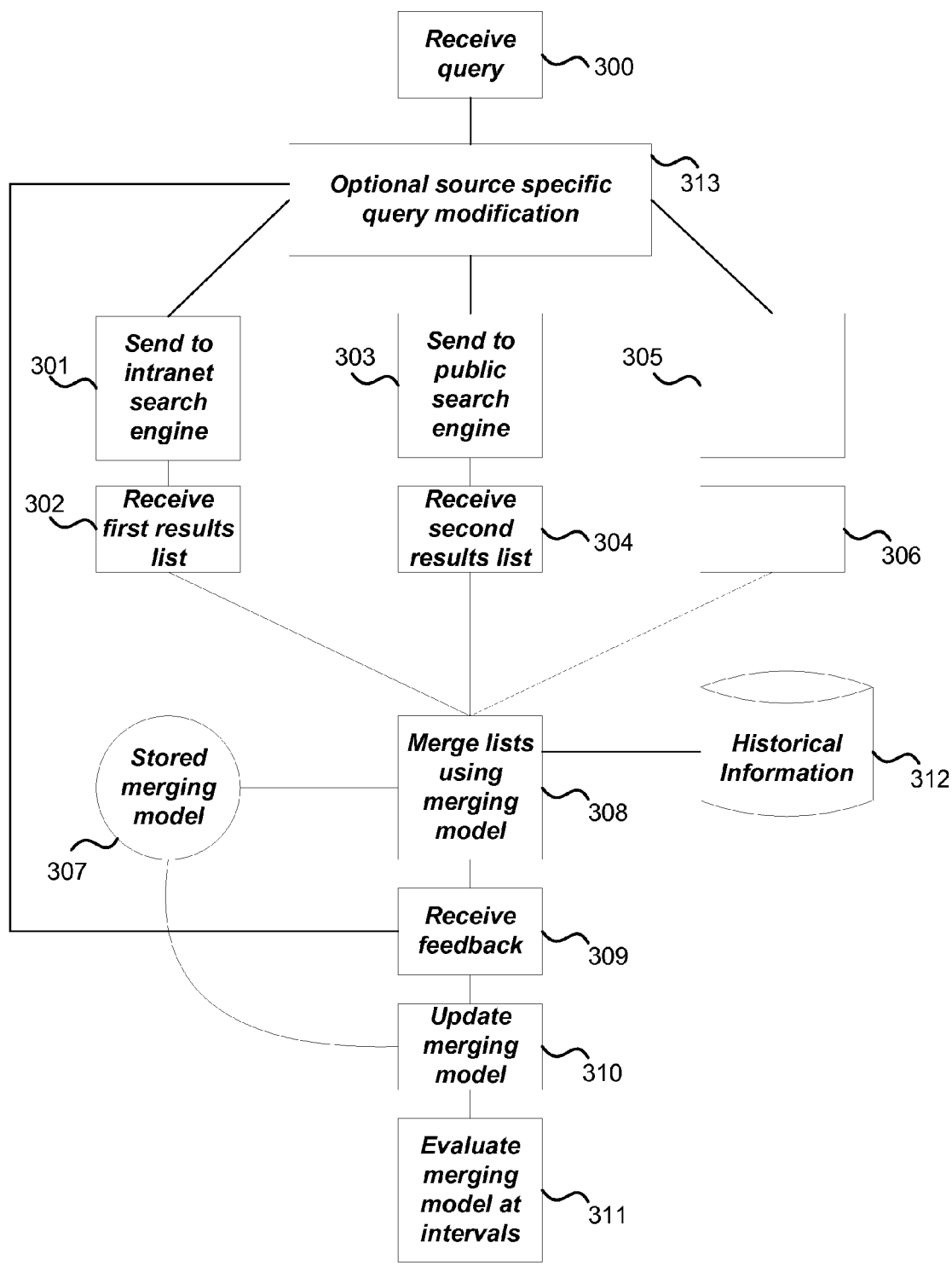
FIG. 3 is a flow diagram of a method of merging results at an information retrieval system.
Figure 4:
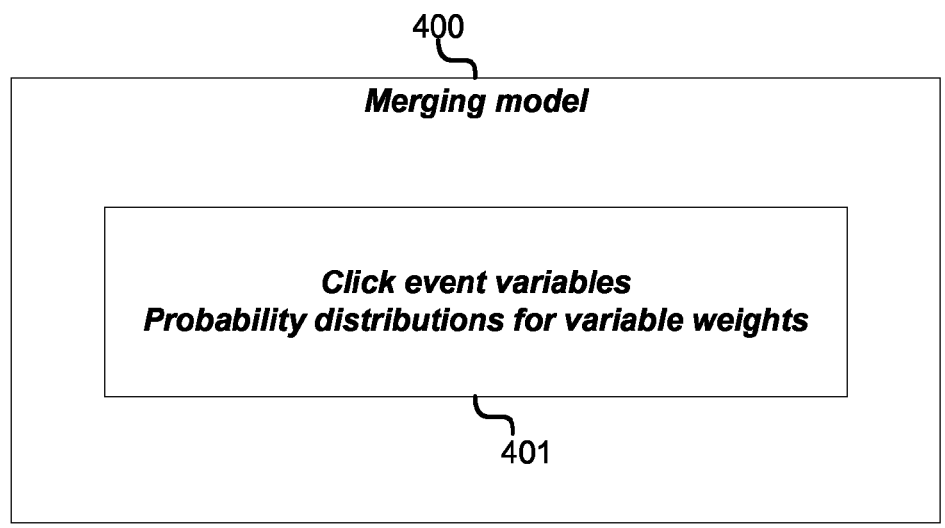
FIG. 4 is a schematic diagram of a merging model.

With reference to FIG. 3 a method at the simultaneous scope search engine 202 is described. (This method is also applicable to federated search engines where the multiple scopes of search are all from public domain sources.) A query is received 300, for example, from a school pupil at client terminal 107. The school pupil is looking for information about penguins for a homework task. The school pupil does not know whether to search using the intranet search engine or using a web search. The simultaneous scope search engine 202 sends 301 the query to the intranet search engine and also to the public search engine (see block 303). This may be carried out automatically in a manner transparent to the school pupil in some cases and so the school pupil does not need any skill at selecting which information sources to search. In some embodiments a query modification process 313 is carried out whereby the query is expanded or modified on the basis of the source it is to be sent to and optionally using feedback information provided from earlier searches (as explained in more detail below). This query modification is carried out automatically and, in some embodiments, in a manner transparent to the school pupil or other user. This enables the system to be operated easily by novice users who are not experienced at how to create suitable queries for particular types of search scope.

In some embodiments more than two information sources may be searched as indicated by blocks 305 and 306 in FIG. 3. A first results list is received 302 from the intranet search engine and a second results list is received 304 from the web search engine. If more than two information sources have been searched then one results list for each information source is received. The results lists are merged 308 using a merging model (which is stored 307) and the merged results list presented to the end user. The merging model may also use historical information (such as click log repositories) 312 and other inputs as described in more detail below with reference to FIG. 5. Feedback is received 309, for example, if the user skips over or clicks on one or more of the items in the merged results list and that feedback is used to update 310 the merging model. The feedback may be implicit feedback or explicit feedback. In addition this feedback may optionally be used to influence the query modification process 313.

The term "explicit feedback" is used to refer to proactive feedback from a user about the relevance of a document retrieved by an information retrieval system. For example, this may be a label assigned to a document by a human user, given a specified query. The label may act to classify the document into one of a plurality of classes depending on how relevant the user perceives the document to be to the query. Explicit feedback can also be thought of as an evaluation of one or more documents in a ranked list in view of the query terms used to obtain that ranked list. Explicit feedback may also be referred to as explicit relevance information.

In order for feedback to be explicit, active user input or action by a user is required in response to a query or request to that user to make a judgment. In contrast, for "implicit feedback" (also referred to as implicit relevance information) active user input in response to a request to make a judgment is not required. It can also be thought of as passive feedback. Examples of implicit feedback include click data such as query-document pairs. A query-document pair is a query entered by a user to a search engine in combination with a link or other identifier of a document. The document was listed in a ranked list of documents presented by the search engine in response to the query and was clicked on by the user. Other examples of implicit feedback include absence of activity at the user interface. For example, an event such as a user not accessing a document from a results list is assumed to be correlated with document irrelevance. There are many other possible types of implicit feedback. For example, dwell time (how long a user directs a user interface pointer over a link in a document list). Different grades of implicit feedback can be envisaged. For example, if a user copies and pastes a link from the results list, or bookmarks the link this can be taken as high quality implicit feedback.

It is recognized herein that such different types of feedback information can advantageously be used to improve merging of search results received from different sources in order to make the merged search results more relevant. For example this is achieved on an inter-query basis. That is, feedback from past user queries and/or assessor judgments is used to improve future merging of search results made by the same or different users.

The merging model is optionally evaluated 311 at intervals and adjusted or replaced as required by the results of those evaluations.

For example, the merging model is a model of search result presentation events and is used to predict whether a result will be selected (or clicked) by a user and also which source or search scope will be preferred (clicked). In this way, observed information about a merged search result presentation event may be used to update the merging model and this process may continue as merged search result presentation events are observed. The merging is then adaptive and learns to merge results in a manner most likely to result in "clicks" in future. Any suitable merging model may be used which models search result presentation events and which may be used to predict whether a result will be selected by a user. This can also be thought of as a model which predicts how relevant a result will be to a given user.

For example, the merging model 400 may be stored in memory using a data structure and may comprise a plurality of search result presentation event variables 401 each having a weight with an associated probability distribution. Each probability distribution may represent the model's belief that its associated weight is correct. For a given result in a result list the model may be used to provide a probability that the given result will be clicked (referred to here as a click probability) by combining the variables, taking into account the weights and the beliefs about the weights. The results may then be merged on the basis of these click probability values. For example, the results may be presented in an ordered list by click probability value.

As the merging model is updated (step 310 of FIG. 3) the weights are learnt and the beliefs about these weights become more certain. An example of a suitable merging model is described in US 2009\0043539A1 published on Feb. 12, 2009, in the name of Microsoft Corporation and incorporated herein by reference in its entirety.

The event variables used in the merging model 400 describe merged search result presentation events whereby the user interface 205 of the simultaneous scope search engine 202 presents a merged list of results to an end user. Any suitable number of event variables may be used although as the number of variables increases the computational resources required also increases. The event variables may be provided as indicator values rather than as real valued variables in order to reduce computational requirements and pruning processes may be used to reduce the memory requirements for the merging model as described in US 2009\0043539A1 referenced above.

Figure 5:
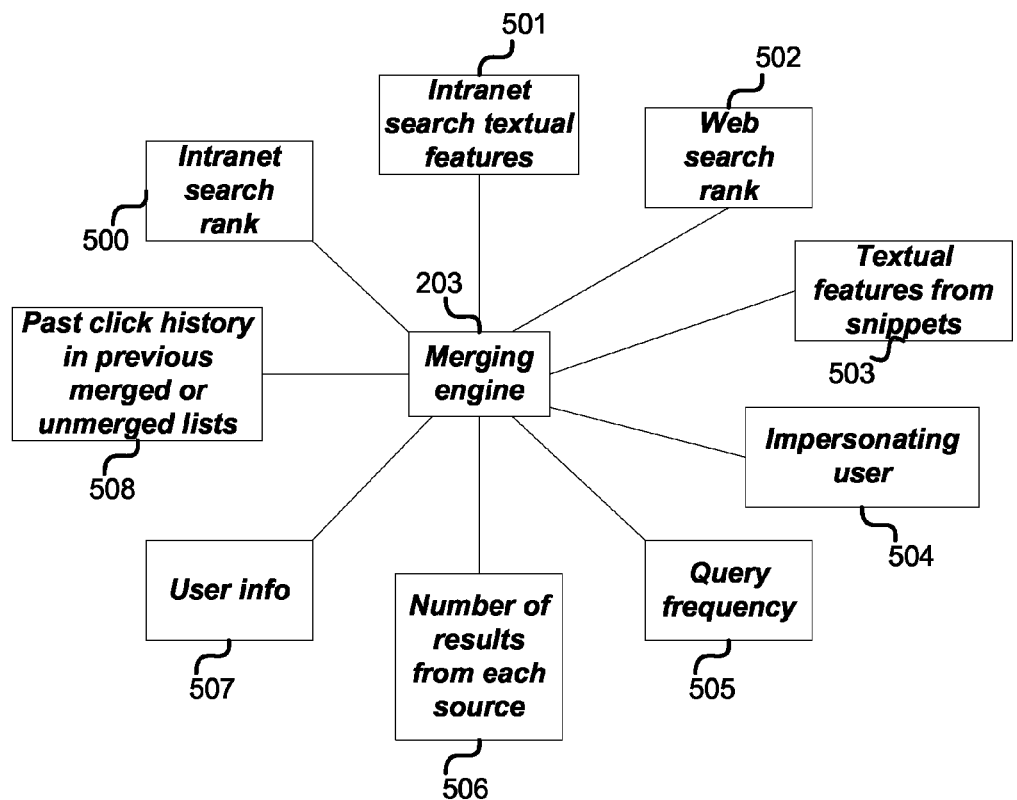
FIG. 5 is a schematic diagram of types of input provided to a merging model.

FIG. 5 gives a non-exhaustive list of examples of event variables taken as input by the merging engine 203 for a particular result to be merged. Any combination of one or more such event variables may be used. These include the intranet search rank 500 or score for the result, textual features 501 that were used for ranking the result by the intranet search engine, the Internet search rank or score 502, textual features 503 extracted from any snippet provided for use with the result by the Internet search engine, whether an impersonating user selection 504 has been set by the user (described in more detail below), a query frequency 505 for the query that gave rise to the result, the number of results 506 obtained from each source for the given search, user information 507, past click history 508 for the result as part of a merged list and/or as part of an unmerged list. Another event variable may simply indicate whether the result is an Intranet or Internet result; another option is to infer this information from the values of the other event variables. For example, the intranet search rank is nil if the result has been obtained from the Internet. Another event variable may be a link-based feature such as a page rank in the PageRank link analysis algorithm.

The merging model is initialized with default weights and trained using observed event data using any suitable training process. Example training processes are described in US 2009\0043539A1 referenced above. The training process may be carried out offline and may continue as the merging engine is used in real-time. That is, offline training is not essential. The training process may be carried out as part of use of the merging system in real-time.

Using the merging model 400 the merging engine is able to form a single ranked list of results from the plurality of results lists received as described with reference to FIG. 3. The merging engine optionally removes duplicates 600 from the lists and, for each of the remaining results, determines 601 a probability of click on that result using the merging model. For the given result the merging engine takes the event variable values received as described above with reference to FIG. 5. In an example, it combines those event variable values taking into account the weights and applies a link function to map the combined variable values into a probability value as described in US 2009\0043539A1 referenced above. The merging engine is arranged to form 602 a single ranked list of results on the basis of the determined probability values.

Figure 7:
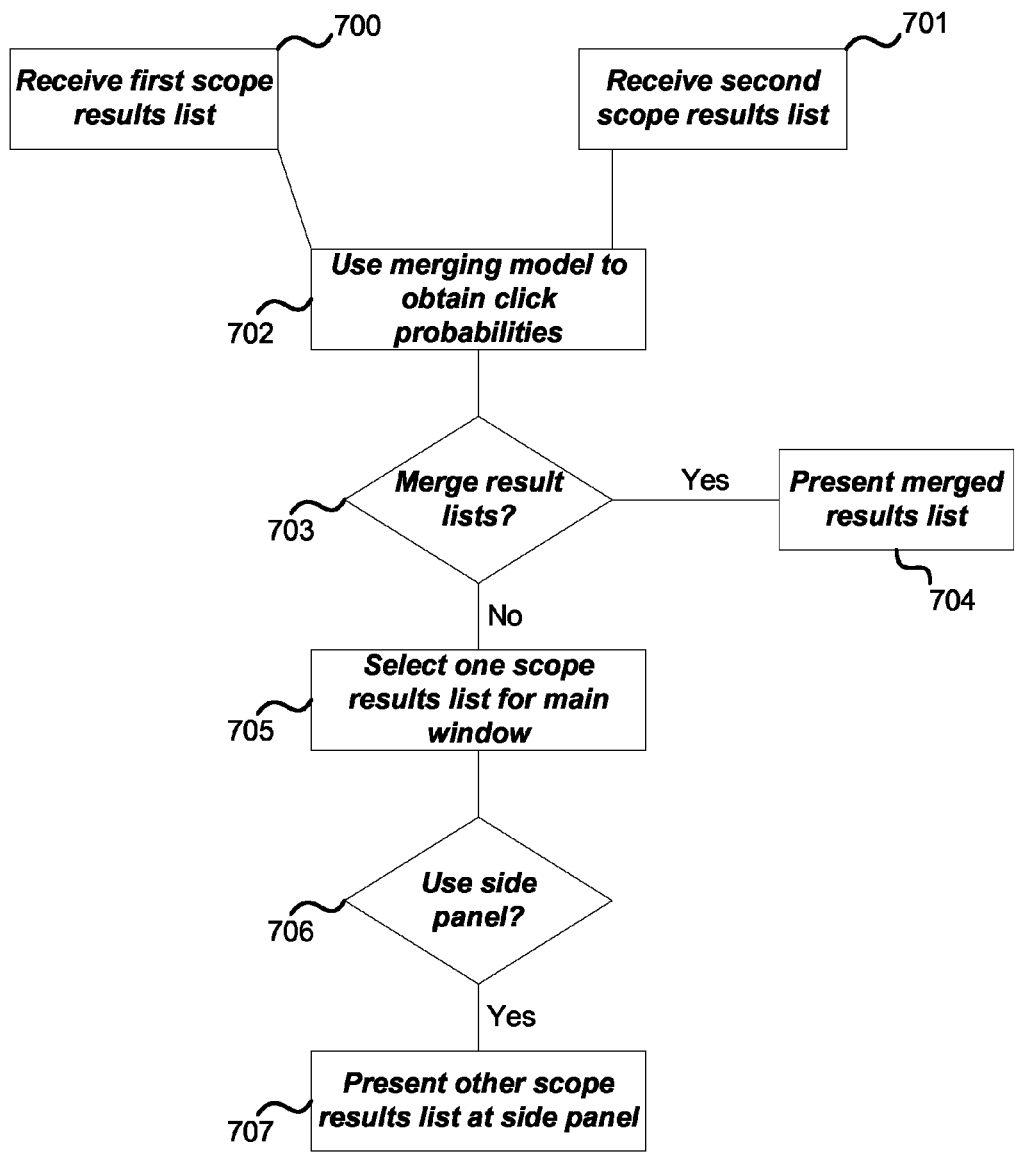
FIG. 7 is a flow diagram of another method at a merging engine.

In some embodiments the merging engine 203 is also arranged to decide whether or not to merge the results lists. For example, in some situations it is not appropriate to merge the results list because the results from the Internet search (for example) are all of reduced relevance as compared to the results from the Intranet search. An example method at the simultaneous scope search engine is now described with reference to FIG. 7.

The simultaneous scope search engine receives 700 a first scope results list from the Intranet search engine (for example). It also receives a second scope results list from the Internet search engine (for example). It uses the merging engine to obtain 702 click probabilities for the results in both results lists as described above. It is then arranged to enter a decision process 703 to decide whether or not to present the results as a merged list. This decision is made using rules, thresholds or other criteria specified at the simultaneous scope search engine. For example, if the average click probability value for the Internet search results is within 10% of that for the Intranet search results, then the results are merged 704. Otherwise the results are not merged. In that case, the simultaneous scope search engine proceeds to select 705 one of the results lists for presentation in a main part of a user interface display. The rules, thresholds or other criteria are used to make this selection and a decision is also made 706 about whether to use a side panel of the display to present the other scope results list 707.

Figure 8:
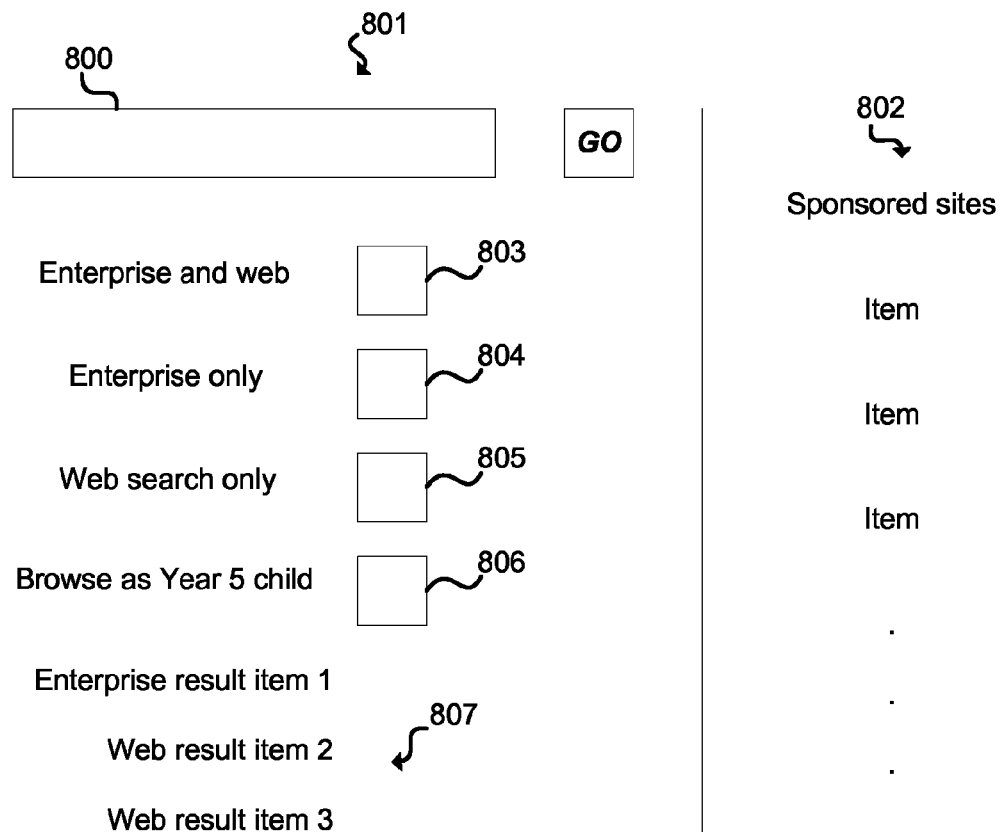
FIG. 8 is a schematic diagram of a user interface provided by an information retrieval system.

FIG. 8 is an example of a user interface display for use by the simultaneous scope user interface 205 in an education domain. This is a particular example described with reference to an education application. The technology is also suitable for use with other application fields by tailoring the user interface display appropriately. It comprises a main display region 801 and a side panel 802. The main display region 801 comprises a text box 800 to enable a user to enter a query and send that query to the simultaneous scope search engine. Below the text box 800 are scope check boxes 803, 804, 805 which enable the user to specify whether the Intranet and Internet should be searched (box 803), only the Intranet should be searched (box 804) or only the Internet should be searched (box 805). Another check box 806 enables the user to impersonate another user which in this example, is a "year 5 child" being a school pupil who is 10 years old. Below the scope check boxes a display of the results is given in a ranked list 807. An indication may be provided alongside each result indicating the source that the result was obtained from. However, this is not essential. Results may also be displayed in the side panel 802 as mentioned above.

Figure 6:
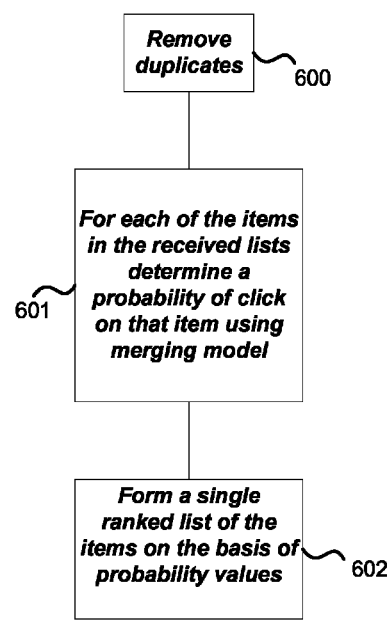
FIG. 6 is a flow diagram of a method at a merging engine.
Figure 9:
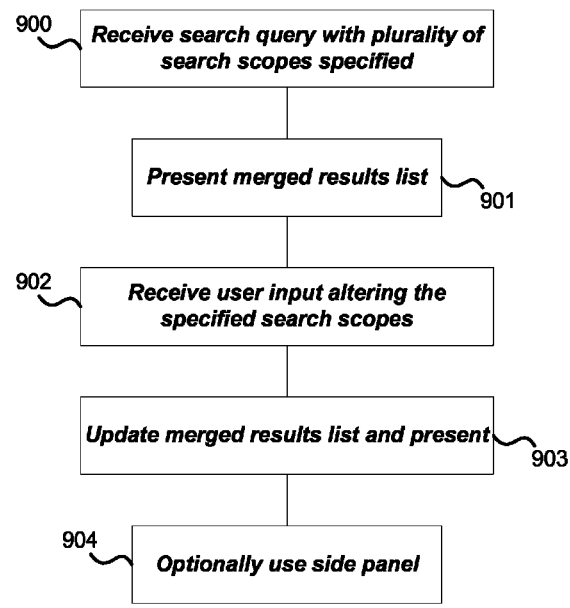
FIG. 9 is a flow diagram of a method at an information retrieval system when search scopes are altered.

An example method at a simultaneous scope search engine is now described with reference to FIG. 9. A search query is received 900 with a first specified search scope. For example, this might be that both the Intranet and Internet search engines should be searched (in the example of FIG. 8 scope box 803 is checked). The simultaneous scope search engine proceeds to carry out the search and to merge the results lists as described above. The merged results list is presented 901 to the user at the user interface. At this point the simultaneous scope search engine may receive 902 user input altering the specified search scope. For example, the only Intranet search results are now required. In the example of FIG. 8 this corresponds to the user clearing box 803 and checking box 804. The merging engine is arranged to update 903 the merged results list according to the new scope specification and present the revised list in real-time as the user is operating the search engine. This may be achieved by using the click probability values already determined for example, at step 601 of the method of FIG. 6. Results that are removed from the list, for example, the Internet results in the case being discussed, may be presented 904 at a side panel display.

In some embodiments it is possible for a user to impersonate another user in order to influence the way in which the merging engine learns. For example, a teacher may want to impersonate a child for a given query, to promote the selected results for a subsequent child search. An event variable referred to as "impersonating user" 504 in FIG. 5 is used together with a user interface check box 806 or other user input means. If the impersonating user event variable 504 is set the merging engine is arranged to modify the update process of FIG. 3 (step 310) to associate more weight to the corresponding search result presentation event than it would for other events.

Figure 10:
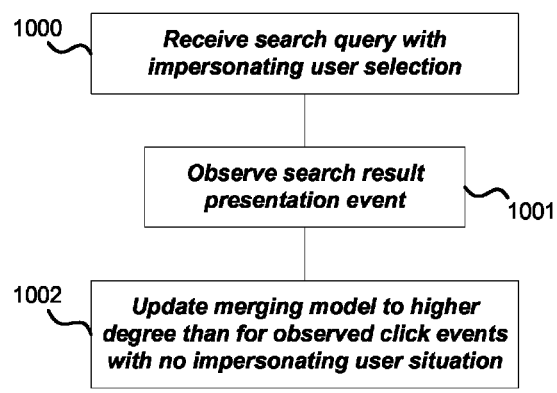
FIG. 10 is a flow diagram of a method at an information retrieval system when an impersonating user selection is made.

For example with reference to FIG. 10, a search query is received 1000 together with a user input specifying an impersonating user condition. A search result presentation event is observed 1001 and the merging model is updated 1002 to a higher degree than for observed events which have no impersonating user condition.

There are many applications in which the asymmetric update mechanism of FIG. 10 is useful as well as the teacher-pupil example already mentioned. For example, in medicine, engineering, pharmaceuticals or other application domains in which it may be required to influence or guide search results for particular groups of users.

As mentioned above, in the Intranet domain information is available to entities in that domain which is not available publicly. For example, this may include information about individual users or groups of users in the Intranet or Enterprise domain. This information may be used by the simultaneous scope search engine to influence how the results are merged. For example, one or more event variables describing user information 507 is used by the merging engine 203 (see FIG. 5). Suppose that an end user is a child in a school who is searching for information about penguins for his or her homework project. The merging engine may receive an event variable specifying the age of that pupil and the weights in the merging model may have been trained to enable the merging process to bias results from the Intranet search engine in this scenario. Also, various of the results from the Internet search may be given different weights according to the age of the pupil. For example, premium content wildlife videos of penguins may be available free from the Intranet search engine. Even though the pupil is unaware of the different search engines and/or the existence of the free high quality content he or she is able to access that information in a fast, simple and effective manner. Even though the user information is only available within the Intranet domain it is used by the simultaneous scope search engine to influence merging of results from both the Intranet and public domain sources.

Figure 11:
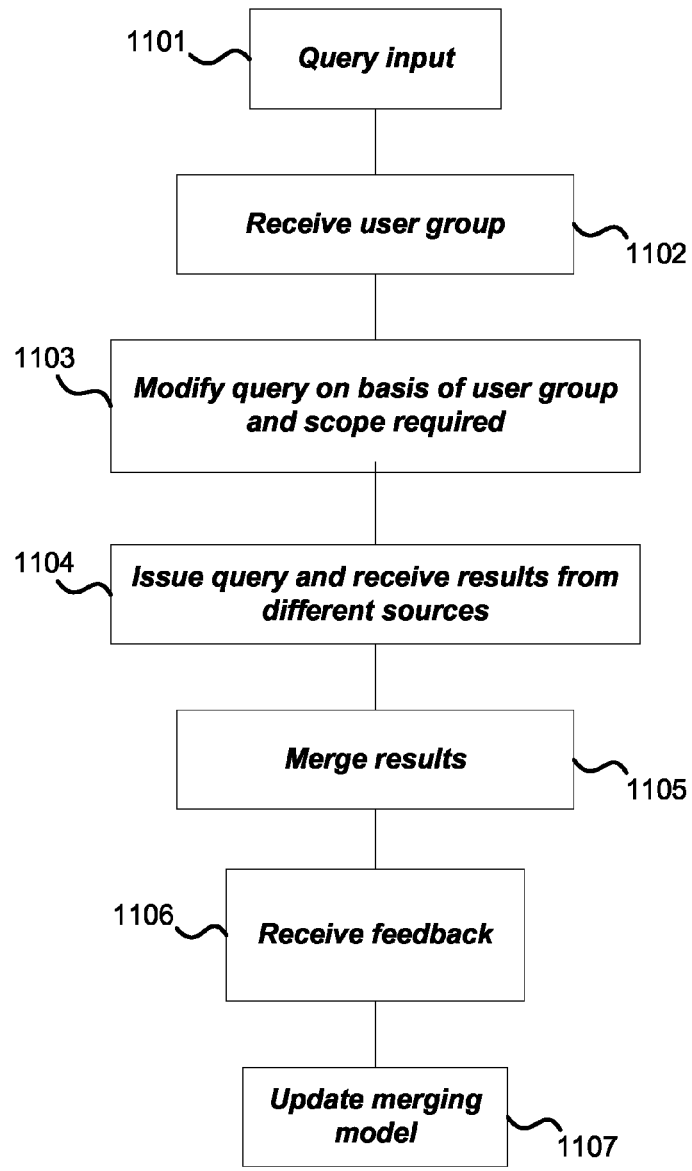
FIG. 11 is a flow diagram of a method at an information retrieval system for query modification.

In some embodiments the user information may be used to carry out query modification, which may also be dependent on the information source to be searched. This is now described with reference to FIG. 11. A query is input by a user (for example, a ten year old child searching for information about penguins). The query is received 1101 by the simultaneous scope search engine which also receives 1102 information about an applicable group for the user (e.g. ten year old school child). The simultaneous scope search engine is arranged to modify the query on the basis of the user group and a search scope. The scope of the search may be explicitly specified by the user selecting check boxes as in FIG. 8 or may be set to a default which is all the available sources. For example, information about previous searches made by users in the same user group may be used to modify the query by automatically adding, removing or editing query terms.

The modified query is issued to the appropriate search engine and results lists are received 1104. The results lists are merged 1105 as described above. Feedback is received 1106 also as described above and used to update the merging model 1107.

It is also possible for the query to be modified in different manners for each information source. For example, the query to be issued to the Internet search engine may be different from that issued to the Intranet search engine.

Figure 12:
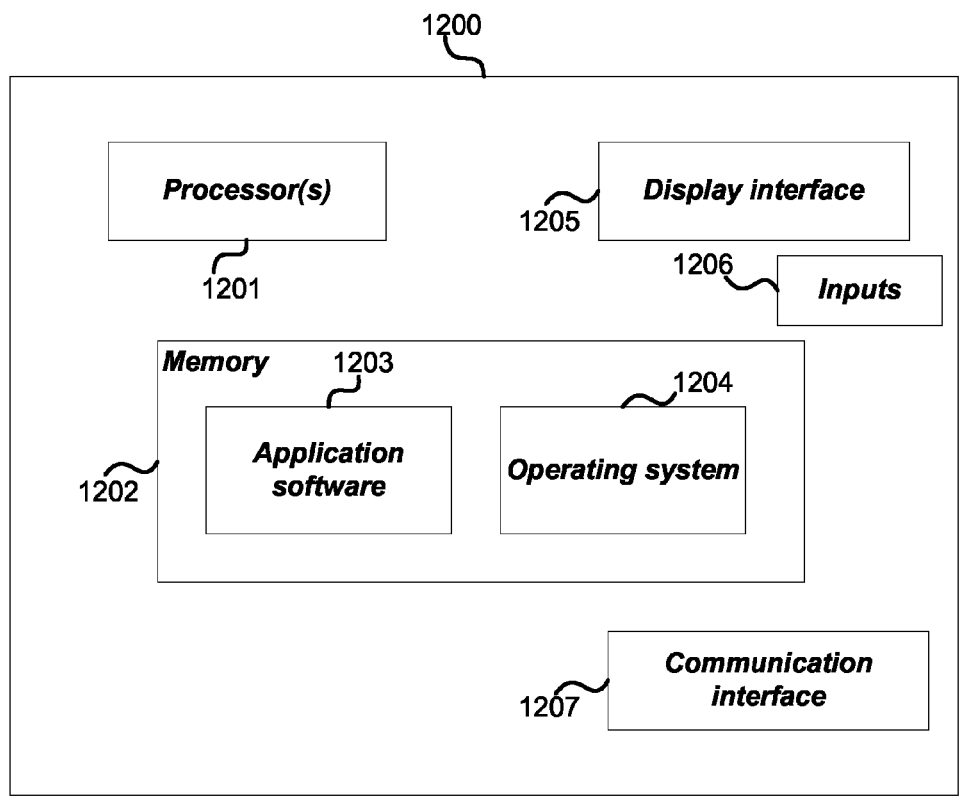
FIG. 12 illustrates an exemplary computing-based device in which embodiments of an information retrieval system may be implemented.

FIG. 12 illustrates various components of an exemplary computing-based device 1200 which may be implemented as any form of a computing and/or electronic device, and in which embodiments of an information retrieval system may be implemented.

The computing-based device 1200 comprises one or more inputs 1206 which are of any suitable type for receiving media content, Internet Protocol (IP) input, queries, user information or other input. The device also comprises communication interface 1207 to enable the device to communicate with other entities in a communications network. For example, the Internet search engine and Internet of FIG. 1 and FIG. 2.

Computing-based device 1200 also comprises one or more processors 1201 which may be microprocessors, controllers or any other suitable type of processors for processing computing executable instructions to control the operation of the device in order to provide an information retrieval system that searches a plurality of information sources. Platform software comprising an operating system 1204 or any other suitable platform software may be provided at the computing-based device to enable application software 1203 to be executed on the device.

The computer executable instructions may be provided using any computer-readable media, such as memory 1202. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1205 may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more 4individual embodiments, those skilled in the art could make numerous alterations to the disclosed embodiments without departing from the spirit or scope of this invention.

The invention claimed is:

1. A method at an information retrieval system arranged to retrieve results from a plurality of different sources comprising:
    at an input, receiving a query;
    at an output, issuing the query to the plurality of different sources, at least one of which is a public domain search engine and at least one of which is a private domain search engine;

at the input, receiving a results list from each of the plurality of different sources;

determining whether to merge said results lists based on a relevancy determination made using a merging model;

forming, by a processor, a complete results list from the received results lists using the merging model, forming the complete results list comprising forming a merged results list using a merging model in a data structure comprising a plurality of weighted event variables describing a complete results list presentation event, the merging model comprising a decision process that determines whether or not to merge results based on the relevance of the results, the decision process deciding to not merge results when a difference between a first measure of relevance of a first set of results and a second measure of relevance of a second set of results satisfies a threshold condition;

arranging a user interface to present the complete results list;

observing user behavior in response to the presented complete results list; and using the observed user behavior to update the merging model.

2. A method as claimed in claim 1, wherein the query is received from a user, wherein the method further comprises receiving user information for that user, and wherein the merging model takes into account the user information.

3. A method as claimed in claim 1, which further comprises storing the merging model using a data structure comprising a plurality of weighted event variables describing a merged results list presentation event.

4. A method as claimed in claim 1, wherein the forming the complete results list from the received results lists comprises using the merging model to determine a probability value for each result being the probability that the result will be clicked by a user and using the probability values to form the complete results list.

5. A method as claimed in claim 1, which further comprises storing the merging model using a data structure comprising a plurality of event variables selected from any of: a search engine rank, textual features, textual features obtained from a snippet, an impersonating user setting, query frequency, a number of results from each of the sources, user information.

6. A method as claimed in claim 1, which further comprises selecting a subset of the received results lists from which to form the complete results list where that subset comprises less than all of the received results lists.

7. A method as claimed in claim 6, which comprises making the selection at least on the basis of probability values obtained from the merging model.

8. A method as claimed in claim 1, which further comprises:

receiving a user input specifying a change to the plurality of different sources;

updating the complete results list according to the change; and arranging the user interface to present the updated complete results list.

9. A method as claimed in claim 1, which further comprises:

receiving a user input specifying an impersonating user condition;

storing the merging model using a data structure comprising a plurality of event variables including an impersonating user event variable; and updating the merging model to a higher degree than for observed user behavior where no impersonating user condition applies.

10. A method as claimed in claim 1, wherein the query is received from a user, and wherein the method further comprises:

receiving user information for that user; and modifying the received query at least based on the user information before issuing the modified query to the plurality of sources.

11. A method as claimed in claim 1, which further comprises modifying the received query before issuing it to the plurality of sources, wherein the modification is source-specific.

12. A method as claimed in claim 1, which further comprises:

arranging an evaluator to evaluate the merging model at intervals; and modifying the merging model on the basis of the evaluation.

13. A method as claimed in claim 1, which further comprises storing the merging model using a data structure comprising a past click history event variable.

14. A method, at an information retrieval system arranged to retrieve results from a plurality of different sources, the method comprising:

receiving a query from a user in a private domain;

receiving information about the user, including user input specifying an impersonating user condition;

issuing the query to the plurality of sources, at least one of which is in a public domain and at least one of which is in the private domain to which the information retrieval system has access;

receiving a results list from each of the plurality of sources;

forming a merged results list by a processor from the received results lists using a merging model which takes into account the user information, wherein the forming comprises using the merging model to determine a probability value for each result being the probability that the result will be clicked by a user and using the probability values to form the merged results list;

arranging a user interface to present the merged results list;

observing user behavior in response to the presented merged results list; and using the observed user behavior to update the merging model.

15. A method as claimed in claim 14, which further comprises storing the merging model using a data structure comprising a plurality of weighted event variables describing a merged results list presentation event.

16. A method as claimed in claim 14, in which the merging model further comprises:

determining whether to merge results list based at least on the merging model; and forming, by a processor, a complete results list from the received results list using the merging model.

17. An information retrieval system comprising:

an input arranged to receive a query;

an output arranged to issue the query to a plurality of sources;

the input being arranged to receive a results list from each of the plurality of sources;

memory storing a merging model in a data structure comprising a plurality of weighted event variables describing a complete results list presentation event, the merging model comprising a decision process that determines whether or not to merge results based on the relevance of the results, the decision process deciding to not merge results when a difference between a first measure of relevance of a first set of results and a second measure of relevance of a second set of results satisfies a threshold condition;

a processor forming a complete results list from the received results lists using the merging model; and a user interface arranged to present the complete results list;

wherein the processor is arranged to observe user behavior in response to the presented complete results list and to use the observed user behavior to update the merging model.

18. An information retrieval system as claimed in claim 17 wherein the processor is arranged to observe both explicit and implicit feedback.

19. An information retrieval system as claimed in claim 17 wherein the sources are independent of one another and wherein at least one of the sources is in a public domain and at least one of the sources is in a private domain.

20. An information retrieval system as claimed in claim 17 wherein the input is arranged to receive user information and wherein the memory stores the merging model such that it takes into account the user information.

21. An information retrieval system as claimed in claim 17 wherein the processor is arranged to modify the received query before it is issued to the plurality of sources such that the modification is on the basis of user information.

* * * * *